(12) United States Patent
Filsfils et al.

(10) Patent No.: US 10,165,093 B2
(45) Date of Patent: Dec. 25, 2018

(54) GENERATING SEGMENT ROUTING CONDUIT IN SERVICE PROVIDER NETWORK FOR ROUTING PACKETS

(71) Applicant: CISCO TECHNOLOGY, INC., San Jose, CA (US)

(72) Inventors: Clarence Filsfils, Brussels (BE); Muthurajah Sivabalan, Kanata (CA); Stefano B. Previdi, Rome (IT); Tarek Saad, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 15/244,735

(22) Filed: Aug. 23, 2016

(65) Prior Publication Data

US 2017/0064717 A1 Mar. 2, 2017

Related U.S. Application Data

(60) Provisional application No. 62/212,522, filed on Aug. 31, 2015.

(51) Int. Cl.
*H04L 29/06* (2006.01)
*H04L 12/801* (2013.01)
(Continued)

(52) U.S. Cl.
CPC .......... *H04L 69/22* (2013.01); *H04L 41/5051* (2013.01); *H04L 45/50* (2013.01);
(Continued)

(58) Field of Classification Search
CPC ..... H04L 69/22; H04L 41/5051; H04L 47/17; H04L 45/50; H04L 41/5077; H04W 88/12; H04W 88/16
See application file for complete search history.

(56) References Cited

U.S. PATENT DOCUMENTS

| | | | |
|---|---|---|---|
| 6,205,429 B1 * | 3/2001 | Peng ................ | G11B 20/10527 704/500 |
| 7,269,132 B1 * | 9/2007 | Casey ................. | H04L 41/0663 370/219 |

(Continued)

OTHER PUBLICATIONS

Farinacci, D., et al., "Generic Routing Encapsulation (GRE)," Network Working Group, RFC 2784, Standards Track, Mar. 2000, 9 pages; https://tools.ietf.org/pdf/rfc2784.pdf.

(Continued)

*Primary Examiner* — Tejis Daya

(57) ABSTRACT

Utilizing the systems disclosed herein, a network element (in a network) controls, within another network, the constraints of a service, timing of the creation of the service, and selection a service on which a packet is transmitted. For example, a first network element (located in a first network) receives a request associated with initiating a service. The request is received from a second network element located in a second network and includes at least one path constraint. The first network element controls creation of the service in the first network on behalf of the second network element located in the second network by, e.g., identifying a path based, at least in part, on the at least one path constraint; and binding an identifier and an interface to the path, wherein the interface is associated with one or more operation to perform on any traffic that is labeled with the identifier.

20 Claims, 7 Drawing Sheets

(51) Int. Cl.
*H04L 12/723* (2013.01)
*H04L 12/24* (2006.01)
*H04W 88/12* (2009.01)
*H04W 88/16* (2009.01)

(52) U.S. Cl.
CPC .......... *H04L 47/17* (2013.01); *H04L 41/5077* (2013.01); *H04W 88/12* (2013.01); *H04W 88/16* (2013.01)

(56) References Cited

U.S. PATENT DOCUMENTS

| | | | |
|---|---|---|---|
| 8,675,488 B1 | 3/2014 | Sidebottom et al. | |
| 9,231,726 B2* | 1/2016 | Lee | H04L 45/00 |
| 9,634,867 B2* | 4/2017 | Lee | H04L 12/6418 |
| 9,705,815 B2* | 7/2017 | Mattson | H04L 47/70 |
| 9,780,909 B2* | 10/2017 | Wood | H04J 14/0286 |
| 9,813,333 B2* | 11/2017 | Zhao | H04L 45/50 |
| 9,825,845 B2* | 11/2017 | Wang | H04L 45/125 |
| 9,825,856 B2* | 11/2017 | Yong | H04L 45/74 |
| 2005/0071130 A1* | 3/2005 | Benjamin | H04L 41/0233 702/188 |
| 2009/0285101 A1* | 11/2009 | Lu | H04L 41/12 370/238 |
| 2011/0216779 A1* | 9/2011 | Peterson | H04L 12/56 370/401 |
| 2012/0092986 A1* | 4/2012 | Chen | H04L 45/28 370/228 |
| 2012/0147768 A1* | 6/2012 | Johnsson | H04L 12/10 370/252 |
| 2012/0179796 A1* | 7/2012 | Nagaraj | H04L 45/22 709/223 |
| 2013/0322248 A1* | 12/2013 | Guo | H04L 45/507 370/235 |
| 2014/0010083 A1 | 1/2014 | Hamdi et al. | |
| 2014/0233385 A1 | 8/2014 | Beliveau et al. | |
| 2015/0003455 A1* | 1/2015 | Haddad | H04L 45/38 370/392 |
| 2015/0188804 A1* | 7/2015 | Ashwood-Smith | H04L 47/32 370/392 |
| 2015/0207671 A1* | 7/2015 | Farkas | H04L 45/48 370/228 |
| 2015/0271102 A1 | 9/2015 | Antich | |
| 2015/0326675 A1* | 11/2015 | Kini | H04L 67/16 709/224 |
| 2016/0028640 A1* | 1/2016 | Zhang | H04L 45/306 370/389 |
| 2017/0041223 A1* | 2/2017 | Akashi | H04L 45/66 |
| 2017/0331672 A1* | 11/2017 | Fedyk | H04L 41/046 |

OTHER PUBLICATIONS

Kent, S., et al., "Security Architecture for the Internet Protocol," Network Working Group, RFC 4301, Standards Track, Dec. 2005, 101 pages; https://tools.ietf.org/pdf/rfc4301.pdf.

Housley, R., et al., "Using Advanced Encryption Standard (AES) CCM Mode with IPsec Encapsulating Security Payload (ESP)," Network Working Group, RFC 4309, Standards Track, Dec. 2005, 13 pages; https://tools.ietf.org/pdf/rfc4309.pdf.

Rosen, E., et al., "BGP/MPLS IP Virtual Private Networks (VPNs)," Network Working Group, RFC 4364, Standards Track, Feb. 2006, 47 pages; https://tools.ietf.org/pdf/rfc4364.pdf.

Bates, T., et al., "Multiprotocol Extensions for BGP-4," Network Working Group, RFC 4760, Standards Track, Jan. 2007, 47 pages; https://tools.ietf.org/pdf/rfc4760.pdf.

Mahalingam, M., et al., "Virtual eXtensible Local Area Network (VXLAN): A Framework for Overlaying Virtualized Layer 2 Networks over Layer 3 Networks," Network Working Group, RFC 7348, Aug. 2014, 22 pages; https://tools.ietf.org/pdf/rfc7348.pdf.

\* cited by examiner

GENERATING SEGMENT ROUTING CONDUIT IN SERVICE PROVIDER NETWORK FOR ROUTING PACKETS

CROSS-REFERENCE TO RELATED APPLICATION

This application claims the benefit of priority under 35 U.S.C. § 119(e) to U.S. Provisional Application Ser. No. 62/212,522, entitled "SEGMENT ROUTING CONDUIT ENABLING CUSTOMER TO CONTROL PATH ON WHICH TRAFFIC IS TRANSPORTED", filed Aug. 31, 2015, which is hereby incorporated by reference in its entirety.

TECHNICAL FIELD

This disclosure relates in general to the field of communications and, more particularly, to enabling a network element to control creation of services in another network.

BACKGROUND

A service provider (SP) operates a network over which traffic flows to and/or from one or more customers. The traffic flows through the network over a path. For example, a path may comprise a number of segments (or hops), where each segment identifies a link between adjacent network elements in the service provider's network. Traditional systems select paths for traffic using the same set of criteria for all requests (e.g., shortest path optimized for bandwidth). Thus, the paths (in the service providers network) on which traffic is transported tend to not differ from customer to customer. Some service providers offer different classes of service. Such class differentiation does not change the basic criteria for path selection and may only change how the likelihood that packets are dropped in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
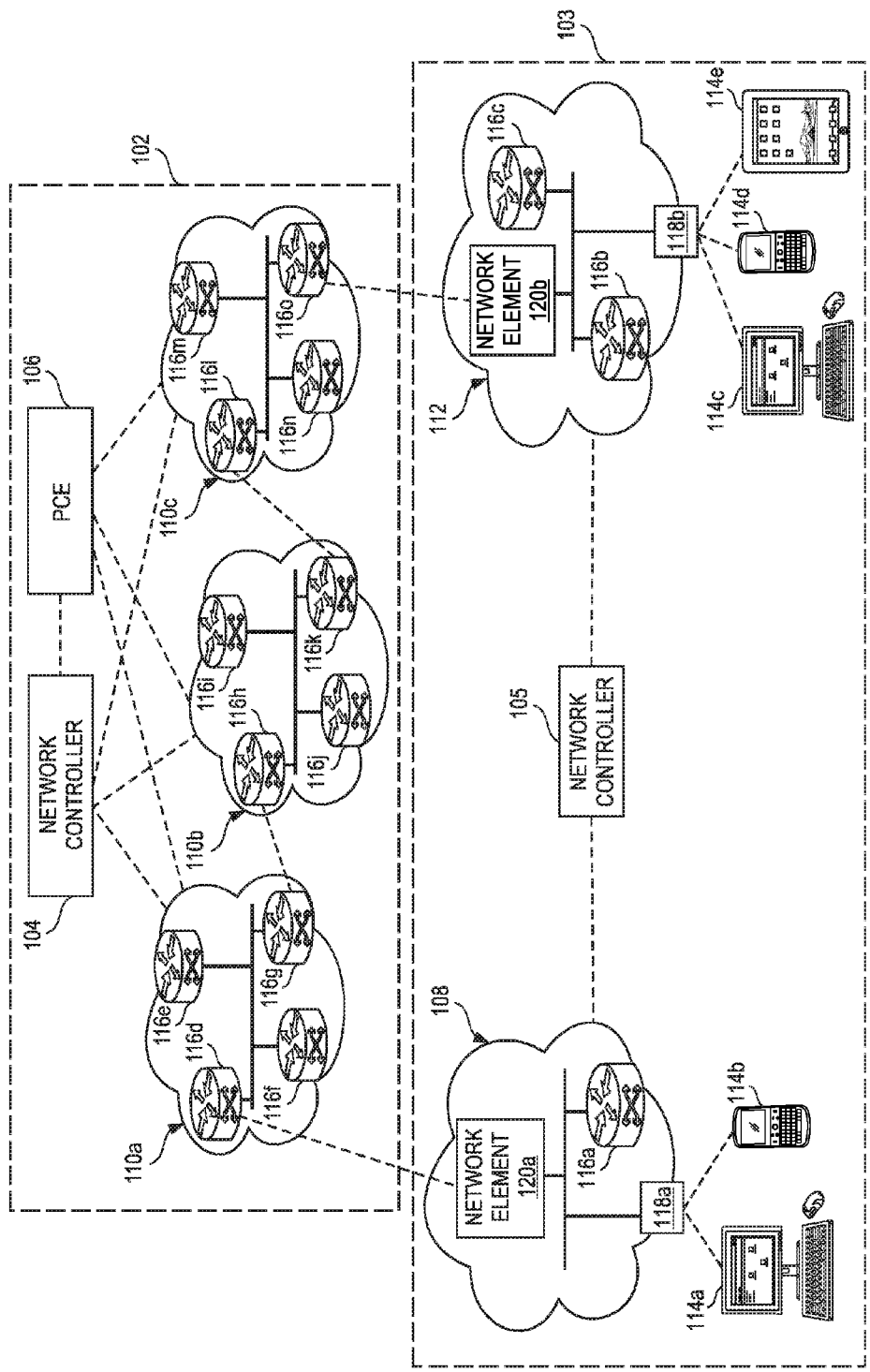
FIG. 1 illustrates a communication system 100 for managing network resources, according to an embodiment of the present disclosure.

In one example, a method comprises receiving, at a first network element located in a first network, a request associated with initiating a service, wherein the request comprises at least one path constraint and is received from a second network element located in a second network. The first network element controls creation of the service in the first network on behalf of the second network element located in the second network by, e.g., converting the at least one path constraint to service provisioning data according to a data encoding protocol; identifying a path based on the service provisioning data; and binding an identifier and an interface to the path, wherein the interface is associated with one or more operation to perform on any traffic that is labeled with the identifier.

Example Embodiments

Service providers use both a control plane and a data plane to control and operate their network. The control plane controls the functioning of the data plane. For example, the control plane may comprise a communication protocol (e.g., a routing protocol) used to communicate control data (e.g., routing tables or portions thereof) to between network elements (such as router, servers, and the like). The data plane, or forwarding plane, may comprise processes and/or algorithms (e.g., executed by the network elements) that utilize the control data to decide how to transport data traffic through the network (e.g., where an incoming packet of the data traffic should be next transmitted). In short, the control plane is used to disseminate information regarding network paths that are used for the data plane (e.g., to share routing and/or switching information with one another). Control plane data may be central or distributed. In a central model, a central network element (or relatively small set of central network elements) transmits control data to the network elements in the network. In a distributed model, each network element may transmit (and/or share) control data with its neighbor.

As used herein in this Specification, the term 'network element' is meant to encompass any of the aforementioned elements, as well as servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the path differentiation operations thereof. This may be inclusive of appropriate algorithms and communication protocols that allow for the effective exchange of data or information.

A 'service' is inclusive of a path through a network that meets certain constraints. In a broad sense, a constraint can be any limitation that the path is to meet (e.g., a threshold value of any characteristic of the path). For example, the constraint may include any one or more of a segment routing traffic engineering policy (SRTE policy), an Include Route Object (IRO), a bandwidth (e.g., an amount of available bandwidth), a list of network elements that the path must traverse, a list of segment routes that the path must traverse, a latency, a policy, an affinity, an administrative group, a path characteristic, a metric type, a hop limit, a priority, a symbolic name, a record route, a label stack, a traffic engineering metric, an Border Gateway Protocol community value, a category of tagged routes within a Border Gateway Protocol community, an Interior Gateway Protocol (IGP) metric, administrative group, a bound on a path cost that must not be exceeded for the path to be considered as acceptable, a bound on a path cost that must be exceeded for the path to be considered as acceptable, a hop count, and/or other constraint. In further examples, the constraint can be an attribute of any hop (i.e., a node or link) in the path. For example, the path may be required to include a network element that applies a function to a packet such as a filter, a firewall, a load balancer, applying a tag, removing a tag, operating on an identifier in the packet, or any other function applied to a packet or the contents therein.

Some services include paths defined using segment routes, each of which may be an adjacency segment or a nodal segment. A segment route is identified by a segment route identifier (SID). Both adjacency segments and nodal segments are used by a network element to transport packets through a network. In operation, an ordered list of SIDs may be inserted into data traffic (e.g., packets of the data traffic) and, at each hop used to transport the data traffic though the network, a next SID is read from the list to determine the next hop of the packet; a current network element transmits the data traffic to a destination corresponding to the next SID. An adjacency segment identifies an interface (e.g., a port) on a specific network element (e.g., on the current network element) using a locally unique identifier (e.g., a port identifier). For example, the adjacency segment may identify a local port on which to reach a neighboring (i.e., adjacent) network element (i.e., the current network element transmits the packet to its neighbor using the port identified in the SID). A nodal segment identifies a specific network element using a globally unique identifier (e.g., a network element identifier). Nodal segments are, e.g., used by a network element to identify a route to reach another network element (which may not be an adjacent neighbor). For example, a current network element may identify a network address of another network element in the network to which the packet should be transmitted.

The control plane can be used to create one or more services within a network. A path, through the network, is calculated that meets the constraints of the service. The path is then instantiated in the network. For example, the control plane is used to modify routing tables in the network elements in the network to implement the path (which corresponds to the service). In the example of a service provider (SP) network, the service provider uses the control plane to create services within the SP network.

A service provider provides, as a service to other networks, access to their network. Other networks (e.g., network elements and/or endpoints associated with the other networks) can access the SP network. For example, a customer may use customer premise equipment to transmit data over the SP's network. Customer premise equipment (CPE) is inclusive of any device (e.g., network element, endpoint, or other device, whether physical or virtual) that is located within a customer's network. In addition to basic access, the SP can use the control plane to define several classes of service in the data plane in the SP network. Each of the classes of service is a service that has a different quality relative to other classes of service. For example, service providers may offer classes such as "Platinum," "Gold," "Silver," and "Bronze" which correspond to decreasing quality (e.g., "Platinum" is the best and "Bronze" is the worst) measured in terms of reliability (e.g., likelihood of a packet being dropped) and availability (e.g., likelihood of the path or nodes or links therein being functional), and/or or bandwidth (e.g., likelihood that an available bandwidth is at or above a threshold percentage of the total bandwidth capability on the path). The SP offers the service classes of service to their customers. Each customer chooses from the pre-defined options of classes of service. As traffic is received from the customer, the SP steers traffic from the customer onto the class of service selected by the customer. Each of the classes of service is shared between other customers of the service provider. Moreover, beyond selection of class of service, the network elements in the customer's network have virtually no control over the path through the service provider's network utilized for their data traffic.

Many organizations have strict technical requirements for their data traffic and, therefore, would benefit from the ability to define (and manage) the services (i.e., paths) on which their data traverses a network. As a result, some organizations maintain their own transport networks in order to have unlimited control over the control plane of the network for service creation. However, maintaining a separate transport network is expensive and, therefore, is either undesirable or unfeasible for many organizations. Thus, many organizations are limited to using a service provider's network and must choose from the classes of service defined by the service provider. It would be desirable if a service provider could provide, to a customer, a level of control that is similar (in part) to that of managing their own network.

It is noted that, within a network, path computation clients (PCCs) and path computation element (PCEs) can be used to create new, ad hoc services. A PCCs and PCEs interoperate in a client-server relationship, with the PCC being the client and the PCE being the server. The PCC requests a path from a PCE; the PCE generates and responds to the PCC with the path. For example, both a service provider network and customer network may include PCCs and PCE for creating services within their respective networks. However, a PCE and a PCC in a particular network are only able to create service within the particular network in which they are located (and/or have administer rights to create/instantiate paths). They are unable to create paths in other networks and, generally, have no control over the control plane of the other networks. For example, in the context of a SP network, the PCEs and PCCs in the SP network may create paths within the SP network, however such path creation features are unavailable to network elements outside of the SP network (i.e., not available to customers).

Some service provider network can allow customers (e.g., a network element in the customer's network) to control (on a packet-by-packet basis) which class of service to which a packet is sent. However, even when a customer can actively manage which of the (SP-defined) classes of service to send their packets, the customer is still merely selecting from the classes of service defined by the SP and is unable to control constraints and creation of ad hoc services in the service providers network (e.g., due, at least in part, to a lack of control over the control plane of the service providers network). Thus, an existing problem is that customers are unable to control constraints and timing of ad hoc services in the SP network.

Existing systems fail to provide CPEs with a mechanism to control constraints and timing of ad hoc services in another network. Some potential solutions include overlay virtual private networks (VPNs), MPLS IP Virtual Private Networks (MPLS-VPN) (e.g., as defined in Internet Engineering Task Force (IETF) request for comments (RFC) 4364), hybrid networking solutions, and policy-based traffic steering (PBTS). However, each of these potential solutions fails to enable a network element in a first network to control, within a second network, the constraints of a service (i.e., customization), timing of the creation of the service, and selection a service on which a packet is transmitted (i.e., service/path differentiation), among other short-comings.

Overlay Virtual Private Networks (VPNs) may include utilizing, for example, Generic Routing Encapsulation (GRE) (e.g., as defined in IETF RFC 2784 or extensions/ updates thereof), Internet Protocol Security (IPsec) (e.g., as defined in IETF RFC 4301, 4309 or extensions/updates thereof), Virtual eXtensible Local Area Network (VXLAN) (e.g., as defined in IETF RFC 7348 or extensions/updates thereof), or other encapsulation protocol to encapsulate packets from a source node to a destination node. In some cases, the source node, the destination node, or both the source node and the destination node are hardware located at a customer's premises (e.g., a CPE). Such overlay VPNs do not allow the service provider to offer infrastructure differentiation to the customer's data traffic. The lack of infrastructure differentiation results in all traffic (e.g., from all customers) experiencing the same transport path (e.g. shortest path to the CPE according to routing metrics optimized for bandwidth utilization inside the SP network i.e., bulk Internet transport).

MPLS-VPN fails to provide any path differentiation compared to bulk Internet transport. In MPLS-VPN, packets may be allocated different Qualities of Service (e.g., allocated different probabilities of being dropped using different differentiated services code point (DSCP) values); however, each of the packets are routed according to bulk Internet transport and, therefore, essentially follow the same path through the SP network as the bulk Internet transport. Indeed, the service differentiation in MPLS-VPN is minimum compared to Internet traffic.

A service provider may use hybrid networking solutions (e.g., Intelligent Wide Area Network (IWAN)) to provide multiple paths from a CPE through the SP network. For example, one path may provide direct access to MPLS-VPN (with SLA) and an alternative path may provide indirect access to MPLS-VPN. As an example, the alternate path may be provided over the Internet to a secure gateway, which forwards the traffic in a customer Virtual Routing and Forwarding (VRF) to a network element at the edge of the SP's network (e.g., a provider element (PE) device). In effect, the two paths provide redundancy such that if either of the paths fails, any traffic is directed to the remaining path. In such cases, two tunnels exist over the same MPLS-VPN core. While such a system provides redundancy to protect against path failure, such systems fail to provide the CPE with the ability to specify constraints used to define the paths.

Some service providers implement policy-based traffic steering (PBTS) to route incoming traffic onto a forward-class (FC). For example, the service provider may create resource reservation protocol traffic engineering (RSVP-TE) tunnels at an ingress PE and associate each of the RSVP-TE with a FC. The RIB/FIB of the ingress PE is updated to route packets to the tunnel by implementing a PBR policy on an ingress interface of the ingress PE. For example, the PBR policy classifies each packet and sets a FC value for the packet. If the packet matches the policy, the FC values are set to indicate that the packet should be routed on a corresponding one of the RSVP-TE tunnels. For example, if the packet is marked with a non-zero FC value (e.g., FC greater than or less than 0), the packet is routed along the RSVP-TE tunnel that corresponds to the FC. For example, if the packet is marked with a FC value of zero (e.g., FC=0), the packet is routed along the normal shortest-path. The service provider controls the routing of the packets and does not provide this control to the customer. Indeed, the complex classification and PBR decision is done on the ingress PE in the service providers network. Moreover, the customer does not define the tunnels. In effect, this is another approach to offer a customer limited classes of services, which are shared across all customers of the service provider. Furthermore, the customer is unable to define the constraints of the tunnels (e.g., offers no support for a customer to tightly customize constraints).

Each of the above potential solutions fail to enable a first network in a first network (e.g., a CPE in a customer network) to control, within a second network (e.g., within a service providers network), the constraints of a service (i.e., customization), timing of the creation of the service, and selection a service on which a packet is transmitted (i.e., service/path differentiation), among other short-comings. It would be desirable if a service provider could provide, to a customer, a level of control that is similar (in part) to the customers managing their own network. A feature that would approach this level of control would be to provide the customer with a mechanism to create new services on demand, on an ad-hoc basis. Such a feature control would enable a customer to control the constraints of a service, timing of the creation of the service, and selection of which service to use for a packet. Creating new services requires use of the control plane. However, directly exposing the control plane in the service provider's network could create problems of data security, among other things. Thus, an objective technical problem with existing technology is that there is currently no mechanism for a network element in a first network to control the control plane of a second network while maintaining the security of the control plane within the second network.

A segment routing conduit (also referred to herein as a "segment conduit" or "SR conduit"), newly introduced in the present disclosure, addresses the above technical problems (and others). A network element in a first network can use segment conduits to control, within a second network, the constraints of a service (i.e., customization), timing of the creation of the service, and selection a service on which a packet is transmitted (i.e., service/path differentiation). A segment conduit is inclusive of a path, which traverses a network from a start node (i.e., a source) to an end node (i.e., a destination). The segment conduit may be defined, at least in part, by an identifier for the segment conduit (i.e., a segment conduit identifier) and an interface that performs an operation to implement the path. The interface may be a network interface on a network element identified by an interface identifier. The segment conduit may be identified by a tuple including the segment conduit identifier, the interface identifier, and the path. In some cases, the path is an ordered list of segment route identifiers (SIDs) that encode a route through the network from the source to the destination. The control plane of the network is used to bind the segment conduit (i.e., the segment conduit identifier) to the interface identifier and the path. The network element is programmed (using the control plane) to create an instance of the path for the service each time it receives (via the interface) a packet that is to be transported on the service. When a packet—labeled with the segment conduit identifier—is transmitted to an interface associated with the segment conduit, the network element associated with the interface uses the segment conduit identifier to identify the path that corresponds to segment conduit. For example, such binding may comprise using the control plane to programming a routing information base (RIB) and/or a forwarding information base (FIB) of the interface (i.e., the network element on which the interface resides) with instructions that, when executed, insert a representation of the path (e.g., the ordered list of segment route identifiers (SIDs)) into any packet that is labeled with the segment conduit identifier.

Utilizing the segment conduit system disclosed herein, a service provider (SP) can provide a VPN customer with the ability to send traffic between two end-points via differentiated paths within the SP network (e.g. latency optimized, bandwidth optimized, two disjoint paths, path avoiding links with a loss rate larger than X). Using such a system, the VPN customer can control the path on which their flows are transported in a manner that emulates the VPN customer controlling their own dedicated infrastructure. Advantageously, either the customer or the service provider can managed (e.g., create and/or modify) services in the SP network can. The CPE (in the customer's network) is operable to steer packets on a specific segment conduit (without any direct action required on behalf of the SP). The complex flow classification and policy steering onto conduits are possible on the CPE self-managed by the VPN customer. The disclosed segment conduit systems are applicable to Overlay-VPN and MPLS-VPN.

The source and/or destination of a segment conduit (i.e., the source and/or destination of a path corresponding to a segment conduit) can identify a single network element or a group of network elements. In particular, the source and/or destination may be a network address, which identifies a single network address, or a geo-zone, which identifies a group of network elements. For example, the network address may identify a specific incoming port on a provider edge (PE) network element or a specific exit port of a specific egress PE. A 'geo-zone' identifies several network elements (and/or interfaces thereon) that are located in a geographic region (e.g., corresponding to a ZIP Code, a city, a country, a coordinates, or other geographic identifier). For example, a geo-zone may be implemented using an anycast address. An anycast address can identify a set of network elements; an interface on each of the set of network elements is assigned the anycast address (i.e., the interfaces share the same anycast address). When data traffic is transmitted to the anycast address, the traffic is transmitted to one of the interfaces assigned the anycast address. The one interface can selected based on any one or more of the following: a routing policy implemented by network elements in the network (such as the interface nearest the source of the transmission), a load-balancing decision, performance characteristics of the network elements in the geo-zone at the point at which the packet is received, or other criteria. A geo-zone can be implemented by assigning an anycast address to an interface on all network elements that lie within a geographic region. Thus, any data traffic transmitted to the anycast address will be transmitted to a network element in the geographic region. Because a geo-zone generically identifies all of the network elements in the geographic region, a segment conduit can began at a particular network element and can use the geo-zone to have a destination that lies within a geographic region (but does not explicitly identify a single network element as the destination). The use of geo-zones (as opposed to explicitly identifying a network element) allows a flexible definition of a source or destination of a segment conduit. Either the source or the destination of a segment conduit can be a geo-zone.

Advantageously, using a segment conduit, a customer can completely control the routing of their packets through a service provider's network. In some existing systems, all packets received by a provider edge device router follow the same path (i.e., no path differentiation). This lack of differentiation leads customers to flee from the costly MPLS-VPN service in favor of cheap overlay VPN service built on top of internet bulk transport (which also follow the same path as the MPLS-VPN service). The segment conduit system disclose herein offers value to a customer by allowing them to use the service provider infrastructure as if they owned it and also adds value to the SPs by exposing the rich infrastructure they have to their customers.

Turning to FIG. 1, FIG. 1 illustrates a communication system 100 for managing network resources, according to an embodiment of the present disclosure. The communication system 100 comprises a first network 102 and a second network 103 coupled to one another for managing the network resources. Each of the first network 102 and the second network 103 include one or more sub-networks. In some examples, each of the sub-networks may correspond to different data centers. In further examples, each of the sub-networks may correspond to a data center in a different city. The network 102 is coupled to the network 103 by one or more communication channels. As used herein, a 'communication channel' encompasses a physical transmission medium (e.g., a wire), a logical connection (e.g., a radio channel, a network connection), or combination thereof used to convey information signals (e.g., data packets, control packets, etc.) from one or more senders to one or more receivers. A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 100, each communication channel may be a single channel: deployed for both control messages (i.e., messages that include control packets) and data messages (i.e., messages that include data packets) or for only one of control messages or data messages. The communication channels in the system 100 are illustrated as dashed lines between the sub-networks and/or between particular components.

The network 102 includes a network controller 104, a path computation element (PCE) 106, and sub-networks 110a, 110b, and 110c. The network controller 104 can control (i.e., the control plane and the data plane) each of the network elements in the network 102. The PCE calculates paths from a source to a destination through the network 102 (e.g., based on one or more path constraints). The network controller 104 and the PCE 106 are operably coupled to one another. In addition, each of the network controller 104 and the PCE 106 is coupled to each of the sub-networks 110a, 110b, and 110c. Each of the sub-networks 110a-c comprises a plurality of network elements (i.e., network elements 116d-o).

The network controller 104 has global view and control of the network 102 (and the sub-network therein) and, therefore, can manage various aspects of the network. The network controller 104 is the "brains" of the network 102. The network controller 104 is operable to communicate with other network elements in the network 102. The network controller may include interfaces for communicating with network infrastructure (e.g., network elements) and other interfaces for communicating with other elements that utilized the global view and control provide by the controller (e.g., applications). In an SDN environment, the former interface may be referred to as a Southbound Interface and the latter may be referred to as a Northbound Interface. The network controller, itself, may be virtualized based on hardware residing on a plurality of physical devices (e.g., network elements). The network controller 104 can access (e.g., read, write, modify) metadata and/or control information related to any of the network elements of the network 102. The network controller 104 can periodically monitor performance characteristics of a network element. In addition, the network controller 104 can use control plane commands (i.e., the control plane) to specify the operational characteristics of a network element. In a particular example, the network controller 104 can modify a routing information base (RIB) or a forwarding information base (FIB) of a network element in the network element in order to create a new patch in the network 102.

The network 103 includes a network controller 105 and sub-networks 108 and 112. The network controller 105 can control (i.e., the control plane and the data plane) each of the network elements in the network 103. The network controller 105 has capabilities within the network 105 similar to those as described with respect to network controller 104 within network 102. The network controller 105 is coupled to each of the sub-networks 108 and 112. Each of the sub-networks comprises a plurality of network elements (i.e., 120a, 120b, 116a, 116b, 116c, 118a, and 118b). The sub-network 108 comprises a network access point 118a and one or more network elements 120a and 116a. Endpoints 114a and 114b connect to the sub-network 108 (and the larger network of communication system 100) via the access point 118a. The sub-network 112 comprises a network access point 118b and one or more elements 120b, 116g, and 116g.

Endpoints 114c, 114d, and 114e connect to the sub-network 112 (and the larger network of communication system 100) via the access point 118b. Endpoints 114a-e are representative of any type of client device to communicating in communication system 100. Furthermore, endpoints 114a-e can be associated with individuals, clients, customers, or end users. The term 'endpoint' is inclusive of devices used to initiate a communication, such as a computer, a personal digital assistant (PDA), a laptop or electronic notebook, a cellular telephone (e.g., an IPHONE, an IP phone, a BLACKBERRY, a GOOGLE DROID), a tablet (e.g., an IPAD), or any other device, component, element, network element, or object capable of initiating voice, audio, video, media, and/or data exchanges within communication system 100. Endpoints 114a-e may also be inclusive of a suitable interface to the human user, such as a microphone, a display, or a keyboard or other terminal equipment. Endpoints 114a-e may also be any device that seeks to initiate a communication on behalf of another entity or element, such as a program, a conferencing device, a database, or any other component, device, element, or object capable of initiating an exchange within communication system 100. Data, as used herein in this document, refers to any type of numeric, voice, messages, video, media, or script data, or any type of source or object code, or any other suitable information in any appropriate format that may be communicated from one point to another.

Within the context of the disclosure, a 'network' used herein represents a series of points, nodes, endpoints, or network elements interconnected via communication paths. A network offers a communicative interface between sources and/or destinations (hosts), and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In one particular instance, the architecture of the present disclosure can be associated with a service provider deployment. For example, the first network 102 may be a service provider network and the second network 103 may be a customer network. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network. Each sub-networks of FIG. 1 is a network that is connected to other sub-networks in a larger network. In this example, sub-network 108 is operably coupled to sub-network 110; sub-network 110 is operably coupled to sub-networks 108 and 112; and sub-network 112 is operably coupled to sub-network 110.

As mentioned above, each of the sub-networks may correspond to a data center in a different city. For example, within the customer network 103, a data center corresponding to the sub-network 108 may be located in London, Great Britain; a data center corresponding to the sub-network 112 may be located in Manhattan, N.Y., USA. Within the service provider network 102, a data center corresponding to the sub-network 110 may be located in London and a data center corresponding to the sub-network 110c may be located in Manhattan.

Figure 2:
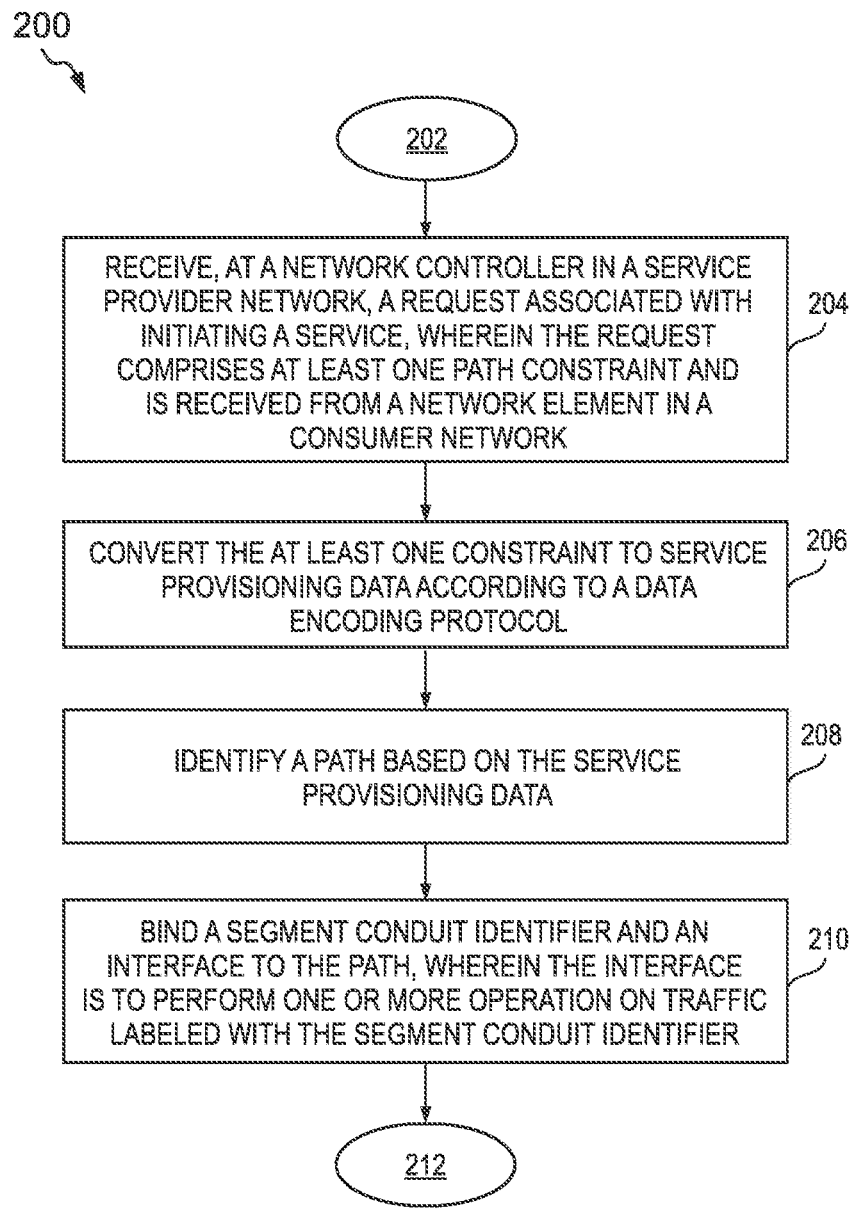
FIG. 2 illustrates logic for managing network services, according to some embodiment of the present disclosure.

As an illustrative example, a bank in London (i.e., a customer) may request a low-latency service from London to Manhattan. Existing systems provide no mechanism for the customers to control constraints and timing of such an ad hoc service in a service provider's (SP) network while maintaining security of the SP network. However, using the conduit segment disclosed herein, the customer can request a low-latency SR conduit from a specific VPN ingress port in London to the Manhattan geo-zone. FIG. 2 (discussed below) illustrates exemplary logic that may be used to in the SP network to respond to such a request from a customer. The customer can steer, into the low-latency SR conduit, latency-sensitive traffic destined for any of its sites in Manhattan. Furthermore, the customer has the entire freedom to send traffic destined to a site in Philadelphia or Boston via the low-latency SR conduit to the Manhattan region. This low-latency SR by (and paid for by) a VPN customer is not used by any other customers (e.g., to ensure security of the customer's data). For example, the service provider may apply his preferred billing model (flat, tiered, usage-based) to any traffic steered on the SR conduit. In some examples, the billing solution supports both SP-managed and customer-managed implementations. The accounting can track, e.g., all packets and bytes on a per-customer basis (and may further separately track billing data for each SR conduit provisioned for the customer). In some examples, each SR conduit is continuously monitored (e.g., for latency, loss, availability) and the performance is reported to the consumer (e.g., reported to a CPE in the customers network).

Turning to FIG. 2, FIG. 2 illustrates logic (200) for managing paths, according to some embodiment of the present disclosure. Logic 200 begins at 202, which may coincide with a start or end point of other logic, routines, and/or applications. In addition, at 202, data (e.g., data structures, objects, values, variables, etc.) may be initialized, retrieved, or accessed for use in logic 200. Logic 200 advances from 202 to 204. At 204, a network controller in a service provider network receives a request associated with initiating a service. The request comprises at least one path constraint (constraints) and is received from a network element in a consumer network. The network controller in a service provider network controls creation of the service in the service provider network on behalf of the network element in a consumer network. At 206, the at least one path constraint is converted to service provisioning data according to a data encoding protocol. At 208, a path is identified based on the service provisioning data. At 210, a segment conduit identifier and an interface are bound to the path. The interface is associated with one or more operation to perform on traffic that is labeled with the segment conduit identifier. After the binding is complete, the network controller may send the segment conduit identifier and an interface identifier to the network element in a consumer network. The logic 200 ends at 212. 212 may coincide with a start or end point of other logic, routines, and/or applications. What follows is a description of further exemplary details regarding the operations performed by executing the logic 200.

Returning to 204, the network controller in the service provider network receives the request associated with initiating the service. The request comprises the at least one path constraint and is received from a network element in a consumer network. The at least one path constraint defines requirements that must be met by a path corresponding to the service. Each of the at least one path constraint may be one or more of the following: a segment routing traffic engineering policy (SRTE policy), a Explicit Route Object (ERO), Include Route Object (IRO), a bandwidth (e.g., an amount of available bandwidth), a list of network elements that the path must traverse, a list of segment routes that the path must traverse, a latency, a policy, an affinity, an administrative group, a path characteristic, a metric type, a hop limit, a priority, a symbolic name, a record route, a label stack, a traffic engineering metric, an Border Gateway Protocol community value, a category of tagged routes within a Border Gateway Protocol community, an Interior Gateway Protocol (IGP) metric, administrative group, a bound on a path cost that must not be exceeded for the path to be considered as acceptable, a bound on a path cost that must be exceeded for the path to be considered as acceptable, a hop count, and/or other constraint. The constraints may be generated based on input received at customer premise equipment (CPE). For example, a user interface on a CPE may receive specifying one or more path constraints, which are used to generate the input. In other examples, each of the at least one path constraint is defined by a service level agreement (SLA) between the service provider network and the customer network. The SLA may define a plurality of constrains, each of which can included in the at least one path constraint in the request.

In addition to the least one path constraint, the request may also include a source identifier and/or a destination identifier that specifies a source and/or a destination of the path (respectively) within the service provider's network. For example, the identifiers may be network addresses of network elements. In other examples, the request includes a source identifier and/or a destination identifier that identifies a network location outside of the service provider's network. In such cases, the network locations outside of the service provider's network may be used to determine a source and destination within the service providers network that are reachable by the a source identifier and/or the destination identifier included in the request. For example, the source identifier may identify a network address of the network element from which the request was received (i.e., the network element in the consumer network). The network controller may identify, within the service provider network, a network element that is closest to the network element in the consumer network.

Returning to 206, the at least one path constraint is converted to service provisioning data according to the data encoding protocol. The at least one path constraint identifies constraints that any path must meet for the service. However, in some cases, the constraints may not be directly usable to calculate a path that meets the constraints. In such cases, the least one path constraint must be converted to the service provisioning data. The service provisioning data is directly usable to generate (e.g., calculate, provision, or instantiate) the path for the service. For example, in networks that use a path computation element (PCE), the constraints must be provided in a request (i.e., the service provisioning data) encoded in path computation element communication protocol (PCEP) (i.e., the data encoding protocol). Path computation element communication protocol (PCEP) is defined in IETF RFC 5440 (and/or extensions/updates thereof), which is referred to herein as the 'PCEP Standard'. The request (e.g., a path computation request (PCReq) message as defined in PCEP Standard) is the service provisioning data, which is encoded in PCEP (i.e., the data encoding protocol). In some example, the at least one path constraint is a SRTE policy that includes one or more segment routing identifiers (SIDs). The SRTE policy can be converted to a PCReq message includes an Include Route Object (IRO) (as defined in the PCEP Standard) that specifies that the path must traverse network elements corresponding to the SIDs. In other examples the at least one path constraint specifies characteristics that the calculated path and/or network elements on the calculated path must meet. The at least one path constraint may be converted to a request parameters object and inserted into the request. In particular, each of the at least one path constraint may be encoded in a PCEP METRIC object, BANDWIDTH object, LSP Attributes (as defined in the PCEP Standard). In addition, any source or destination (or source/destination identifiers) may be encoded in the request as END-POINTS Object (as defined in the PCEP Standard).

Returning to 208, a path is identified based on the service provisioning data. The path may be calculated using the service provisioning data. In other examples, the network controller may be able to directly calculate the path through the SP network based on the service provisioning data (e.g., based on having access to the topology of at least a portion of SP network).

In cases where the PCE is available in the SP network, the service provisioning data is transmitted to the PCE for path computation. For example, the network controller may transmit to the PCE a PCReq message including the service provisioning data. The PCE calculates (based on the service provisioning data) the path the service provider's network, which satisfies the one or more constraint. The path is received from the PCE. The path may be received in a response message encoded in PCEP (i.e., the data encoding protocol). For example, the response message may be a path computation reply (PCRep) message comprising an Explicit Route Object (ERO) that encodes the path through the SP network (e.g., PCRep and ERO as defined in the PCEP Standard).

In further examples, segment routes encode the path through the SP network. An ordered list of segment route identifiers (SIDs) may encode the path from the source node to the designation node in the SP network. In yet other examples, the path corresponds to a service chain in which each in the ordered set of SIDs identifies a service in the service chain. In other examples, the path corresponds to a mix of services and path forwarding instructions. For example, an ingress node may impose a set of SIDs to force a packet to be forwarded on a specific path and also optionally apply specific service(s) (e.g. or QoS or firewall) on traversed nodes of the path.

Returning to 210, a segment conduit identifier and an interface are bound to the path. The interface is associated with one or more operation to perform on traffic that is labeled with the segment conduit identifier. For example, the interface may be a network interface on a network element (e.g., a headend in the service provider's network, a router, a switch, or any other network element). An interface identifier is used to identify the interface. The interface identifier may be a network address, MAC address, an Internet protocol version 6 (IPv6) address, a (MPLS) segment, and/or any other identifier usable (directly or indirectly) to transmit data (e.g., packets) to a network element (and/or an interface thereon). In some examples, the network element that is located in the service provider network. The control plane of the network is used to bind the segment conduit (i.e., the segment conduit identifier) to the interface identifier and the path.

The path (e.g., an ordered set of segment identifiers that define the path) is stored on the network element with a correspondence to the segment conduit identifier (e.g., in a list of segment conduit identifiers for which the network element is programmed to handle). The network element is programmed (e.g., using the control plane) to perform the one or more operation each time it receives (via the interface) a packet that is to be transported on the service. As part of the programming, the network element may receive instructions to search each received packet for a segment conduit identifier and compare a found segment conduit identifier (found in the received packet) to a list of segment conduit identifiers stored by the network element. When the found segment conduit identifier matches one in the list, the network element can retrieve the one or more operation and the path, which were programmed for the found segment conduit identifier. The network element may execute the one or more operation on the packet and/or transmit the packet on the path.

In a particular example, the one or more operation comprises creating an instance of the path for the service by, e.g., appending, to any packet labeled with the segment conduit identifier, segment routing headers that correspond to the ordered set of segment identifiers. In such an example, when a packet—labeled with the segment conduit identifier—is transmitted to an interface associated with the segment conduit, the network element associated with the interface uses the segment conduit identifier to identify the path that corresponds to segment conduit. For example, such binding may comprise using the control plane to programming a routing information base (RIB) and/or a forwarding information base (FIB) of the interface (i.e., the network element on which the interface resides) with instructions that, when executed, insert a representation of the path (e.g., the ordered list of segment route identifiers (SIDs)) into any packet that is labeled with the segment conduit identifier.

The network element may be programmed using a standardized network protocol or by simply changing its configuration with a local interface on the network element. For example, the network element may be programmed using commands encoded in Network Configuration Protocol (NETCONF), which is defined in IETF RFC 6241 (and/or extensions/updates thereof). In other examples, a data model of the network element is updating using YANG data modeling language, which is defined in IETF RFC 6020 (and/or extensions/updates thereof). In further example, a configuration of the network element is updated using a command-line interface (CLI) of the network element.

The logic 200, when executed, enables a network element in a network (e.g., the network element in the consumer network) to control the creation of a service in another network (e.g., the service provider's network). This logic may be repeatedly executed to create multiple services in the other network. For example, the network controller can receiving a plurality of paths corresponding to a plurality of services and bind a corresponding segment identifier and a corresponding interface to each of the plurality of paths. The network controller can send (to the network element in the consumer network) each of the corresponding segment identifiers and corresponding interfaces. Ultimately, the network element in the consumer network can use the corresponding segment identifiers and interfaces to control the routing of packets in the service provider network by selecting at least one of the plurality of services to which to transmit each of the packets based on the corresponding segment identifier. For example, the network element in the consumer network may use a performance based routing policy to select one of the plurality of services to which to send a packet.

The logic 200 may be provisioned in any network controller. For example, the logic 200 may be implemented in the network controller 104 (of FIG. 1), network controller 308 (of FIGS. 3A and 3B and/or 4A and 4B), and/or the network controller 104 (of FIG. 5). A processor (e.g., 508 in FIG. 5) may execute logic 200. Advantageously, the network controller 104 can use the logic 200 to facilitate a network element located in a different network to controlling creation of a service in the network in which the network controller 104 is located (even when the network element does not have access to the control plane of the service provider's network).

In the example of FIG. 2, a network controller executes the logic 200. Alternatively, a network element (other than a network controller) can execute logic similar to the logic 200. For example, logic similar to the logic 200 may be implemented in the network element in any of the network elements of FIG. 1 (e.g., network elements 116*d-o*). In such an example, the network element would receive the request. There may be no need to convert the constraints (at 206) depending on whether a PCE is present within the network. The network element would identify a path and bind the path (208 and 210).

Exemplary Use of SR Conduits to Control Service Creation in Another Network

What follows is a description of an example in which in which a bank located in London (i.e., the customer) uses a segment conduit to control a creation of a service in a service provider network. The customer requests, from the service provider, a segment conduit for a service from London to a geo-zone corresponding to Manhattan, N.Y., USA.

Turning briefly back to FIG. 1 for context for this example, within the customer network 103, a data center corresponding to the sub-network 108 may be located in London; a data center corresponding to the sub-network 112 may be located in Manhattan. Within the service provider network 102, a data center corresponding to the sub-network 110 may be located in London and a data center corresponding to the sub-network 110*c* may be located in Manhattan.

A network element 120*a* located in the customer's data center 108 (i.e., which is in London in this example) generates the request for a segment conduit (via the service provider network 102) to reach the network element 120b located in the customer's data center 112 (i.e., which is in Manhattan in this example). The request requires creation of a new service within the service provider network 102 to reach Manhattan. In other words, the customer is requesting a new segment routing conduit through the service provider network 102 to transmit traffic from the London-based data center 108 to the Manhattan-based data center 112.

The network element 120a generates constraints for a low latency service (e.g., constrains including a latency less than or equal 35 msec; in this example the distance as the crow flies is 5500 km and the approximate speed is at 5 msec/1000 km and therefore ~30 msec is the best achievable latency). In addition, the network element 120a defines the destination of the segment conduit as a geo-zone corresponding to Manhattan. The network element 120a transmits the request (including the constraints) to the network controller 104. The request enters the service provider network 102 at the network element 116d (i.e., a provider edge (PE) device), traverses the network element 116e, and is received by the network controller 104 (e.g., using 204 of logic 200 in FIG. 2). A provider edge device is the network element at the "edge" of the network. A provider edge device may be ingress devices (which handle traffic incoming form another network) or egress devices (which handle traffic outgoing to another network).

A network controller can define the source and destination of the segment conduit. For example, the network controller 104 defines the source of the segment conduit as the PE device (within the SP network 102) at which the request was received from the network element 120a. Thus, the network controller 104 defines the source identifier of the segment conduit as a network address of the network element 116d (e.g., an ingress port L1 of an ingress PE). The network controller 104 defines the destination identifier of the segment conduit as an anycast address corresponding to Manhattan (i.e., an anycast address that identifies the network elements in the Manhattan-based data center 110c (which provides service to the customer's Manhattan-based data center 112).

The above example (of the request for the segment conduit corresponding the low latency service) was introduced in the context of FIG. 1 and is discussed further below in the context of FIGS. 3A and 3B. The network element 120a (in FIG. 1) corresponds to the network element 306 (in FIGS. 3A and 3B). The network element 116d in the service provider network 102 (in FIG. 1) corresponds to the network element 312 in the service provider network 304 (in FIGS. 3A and 3B). The network controller 104 and that PCE 106 (in FIG. 1) correspond to the network controller 308 and PCE 310 (in FIGS. 3A and 3B).

Figure 3A:
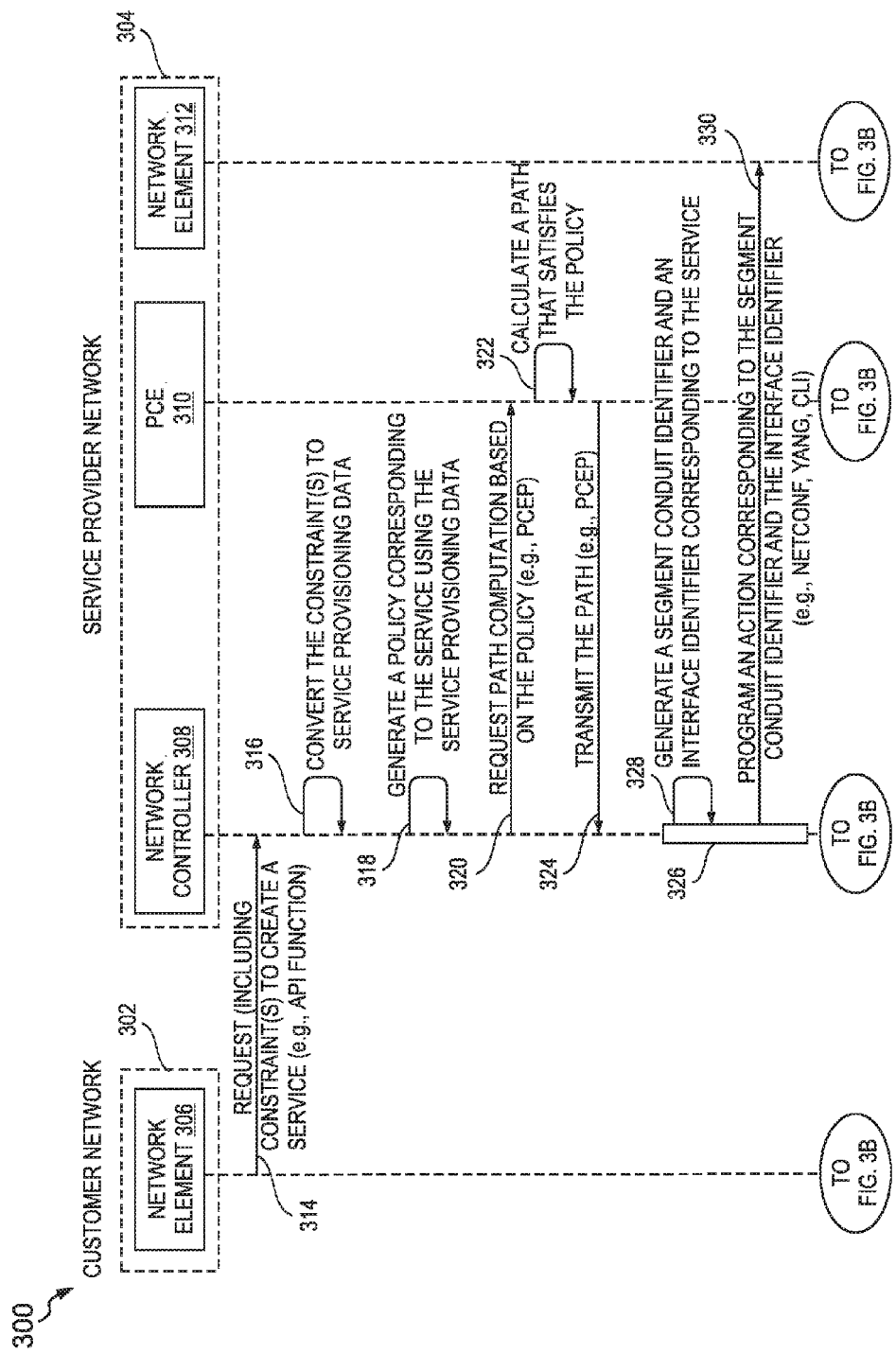
FIGS. 3A and 3B illustrate an exemplary system and workflow for controlling creation of network services, according to some embodiment of the present disclosure.
Figure 3B:
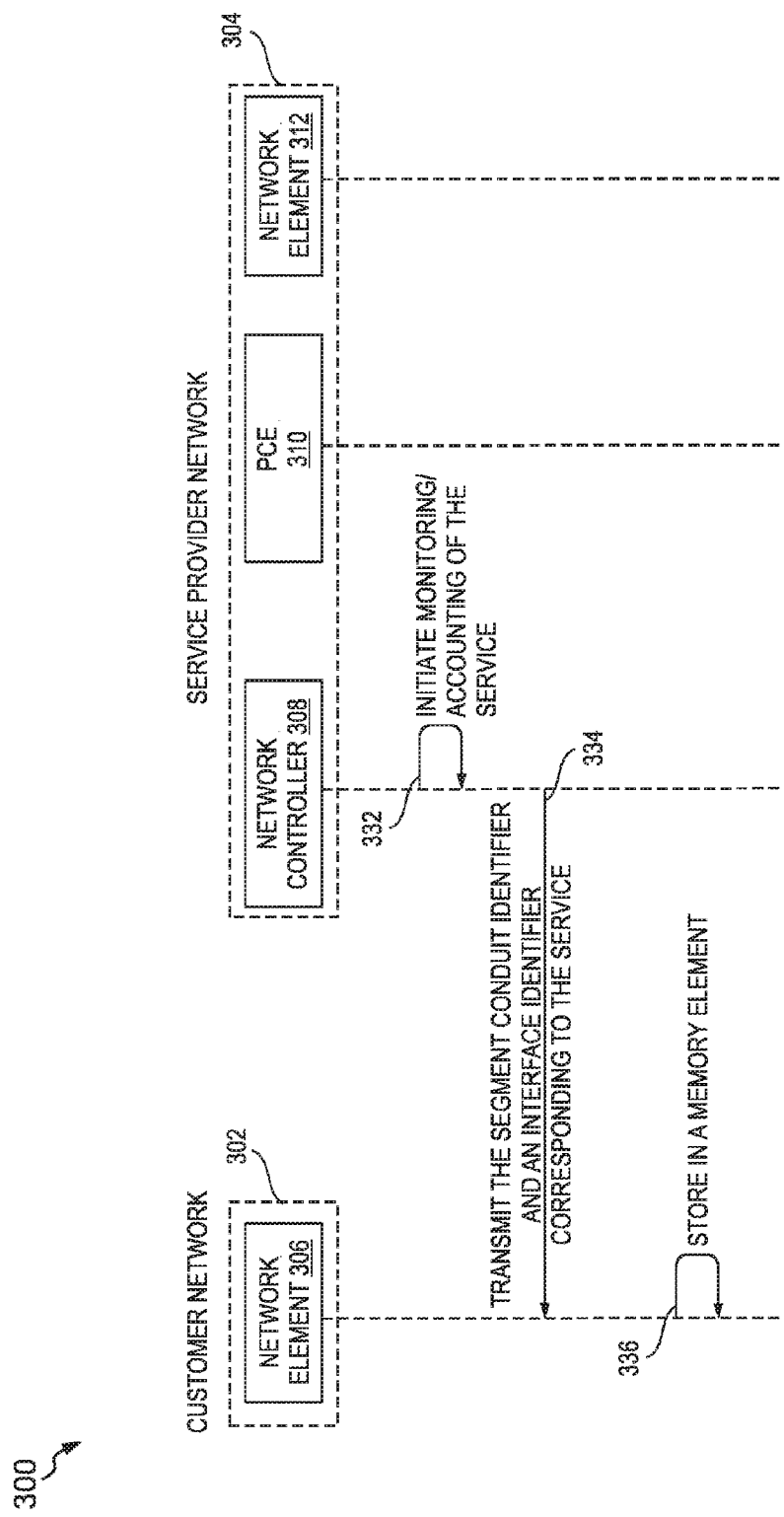

Turning to FIGS. 3A and 3B, FIGS. 3A and 3B illustrate an exemplary system (i.e., system 300) and workflow for controlling creation of network services, according to some embodiment of the present disclosure. The system 300 includes a customer network 302 (a first network) and a service provider network 304 (a second network). The customer network 302 comprises a network element 306. One network element is discussed with respect to the customer network 302 only for simplicity and clarity of the Figures and description; the customer network 302 can include a plurality of other network elements (not illustrated in the FIGS. 3A and 3B). The service provider network 304 includes a network controller 308, a path computation element (PCE) 310, and a network element 312, each of which is coupled to the other components. The network controller 308 and the PCE 310 (of FIGS. 3A and 3B) can operate in a manner as described with respect to the network controller 104 and the PCE 106 (of FIG. 1). The network element 306 (in the customer network 302) uses requests to control constraints and timing of the creation of services in the service provider network 304. The network controller 308 behaves as a proxy for the network element 306 (and generally for the customer network 302) within the service provider network 304.

At 314, the network element 306 transmits to the network controller 308 a request to create a service. The request includes constraints that a path for the service must meet (e.g., to be acceptable to the network element 306). In the example, the request includes the low latency service constraints. In some examples, the request can include additional constraints (e.g., based on an SLA between the customer network 302 and the service provider network 304). The network controller may include an application programming interface (API) through which it can receive commands and data from other network elements. The network element 306 calls a function in the API to transmit the request to the network controller 308. For example, the request may be an input (e.g., an argument) to the function in the API. In some examples, the network controller 308 is a SDN controller (e.g., and the API is a Northbound API (NB-API) into a service provider's SDN controller). The network element uses the request to control the constraints used for and the timing of the creation of a service. The network controller creates the service in response to receiving the request. In effect, the network controller behaves as a proxy for the network element 306 (and generally for the customer network) within the service provider network.

The network controller 308 may define a destination identifier and a source identifier for the request (e.g., as described above). Returning to the above example, the network controller 308 can define the destination identifier as either a specific network element (e.g., router) in Manhattan or rather an anycast address shared by all (or some of) the routers in the Manhattan region (based on the request being for a segment conduit in the geo-zone for Manhattan).

If the service is accepted, the network controller 308 begins the process of generating a path corresponding to the service (e.g., a path that satisfies the constraints requested by the network element 306). If the service is not accepted, due to policy violation or to no feasible path found, the network controller 308 can respond to the network element that requested provisioning of the service with a suitable error to notify of the failure. The controller may suggest an alternative (e.g., next suitable, feasible) path or service that meets a less stringent service constraint.

At 316, the network controller 308 converts the constraints to service provisioning data. For example, using the network controller 308 may execute similar to 206 FIG. 2. Each of the constraints discussed above for low latency service maybe converted to a path computation element protocol. In some examples, the service provisioning data may be stored in a memory accessible to the network controller 308 (e.g., for later use in requesting a new path computation).

At 318, the network controller 308 generates a policy corresponding to the service using the service provisioning data. For example, the network controller 308 may instantiate an SRTE encapsulation policy (SRTE policy) for the network element 312, which requests low-latency optimization towards the destination identifier with a bound of 35 msec.

A path is identified based on the policy and/or the service provisioning data. In some examples, a path is computed locally at the network controller 308 (e.g., possible for latency, loss and resource avoidance/exclusion constraints and when the destination identifier is in the same LSDB as network controller 308). For example, the network controller 308 may calculate the path through the network based on the service provisioning data. Alternatively, the computation can be done centrally (at a PCE) when BW optimization is requested or when network controller 308 and destination identifier are not in the same LSDB.

At 320, the network controller 308 requests path computation based on the policy. The network controller 308 transmits the service provisioning data (and/or the policy generated therefrom) to the PCE 310 in the service provider network 304. In some examples, the constraints (from the original request at 314) are encoded into the request message (e.g., directly, via the service provisioning data, and/or via the policy). The encoding may be a path computation element communication protocol (PCEP) (e.g., generating a PCReq). At 322, the PCE 310 calculates a path that satisfies the policy. The PCE 310 calculated the path through the network based on the policy and/or the service provisioning data. The PCE 310 generates a representation of the path (e.g., a PCR). For example, PCE 310 may generate a path computation reply (PCRep) message comprising an Explicit Route Object (ERO) that encodes the path through the SP network 304. At 324, the PCE 310 transmits the path to the network controller 308. The path may be included in a message. The network controller 308 receives the path from the PCE 310. For example, the network controller 308 may execute similar to 208 in FIG. 2.

Based on the path receive from the PCE 310, the network controller 308 determines that the path corresponds to SID list (e.g., SID1, SID2, SID3). Each of the SIDs (e.g., SID1, SID2, SID3) can either be MPLS segment, an IPv6 segments, or any other segment identifier.

At 326, the network controller 308 binds a segment conduit identifier and an interface to the path. For example, the network controller 308 may execute similar to 210 in FIG. 2. Such binding includes 328, at which the network controller 308 generates a segment conduit identifier and an interface identifier corresponding to the service; and 330, at which the network controller 308 programs, on the network element 312, an action corresponding to the segment conduit identifier and the interfaces identifier. In effect, the network controller 308 provisions the policy on the network element 312 (i.e. the policy generated at 318). As part of the provisioning of the policy, the network controller 308 can request (e.g., at 328) the allocation of an identifier for a local MPLS segment or IPv6 segment (i.e., a segment identifier). This segment identifier identifies the conduit and hence is called the segment conduit identifier. In the example, we refer to the segment conduit from network element 312 towards the Manhattan geo-zone and with latency <=35 msec as CManLat'. The network controller 308 identifies a specific interface (or VRF) on the network element 312 to which packets are to be routed onto the segment conduit (e.g. interface identifier L1). The interface identifier may identify a network element (e.g., 312) in the network that is to handle any packets for the service of the segment conduit. In addition, the network controller 308 may determine that segment conduit can be implemented by the network element 312 performing an action of encapsulating the SID list (e.g., SID1, SID2, SID3) on any packet received on the segment conduit (i.e., via the particular interface L1 on the network element 312). A packet can be encapsulated within a segment conduit using IPv4, IPv6, labeled, layer2, TDM. The service conduit can be realized with the any of the underlay transport technologies, including MPLS, IPv6 or TDM. Any packet labeled with the segment conduit identifier and received via the interface L1 on the network element 312 is impregnated with the SID list. For example, the action may be programmed in the network element 312 via configuration (e.g., using CLI commands), NETCONF, YANG, or other approach. In a particular example, as a result of this provisioning (e.g., the programming at 330), the FIB of the network element 312 is programmed with the following state (e.g., pseudocode):
MPLS: ((ingress interface/VRF==L1) and (ingress label==CManLat))==>pop CManLat push {SID1, SID2, SID3} as an MPLS label stack increment counters OR
IPv6: ((ingress interface/VRF==L1) and (DA==CManLat)) ==>update DA and SRH push {SID1, SID2, SID3} as an MPLS label stack
or insert {SID1, SID2, SID3} as intermediate IPv6 segments increment counters On a provider edge device, if a packet is received on a specific customer facing interface with a specific SID identifying a service (e.g. minimum latency CManLat), the PE device pops the top SID and replaces it with a set of SIDs that realizes the corresponding service associated with CManLat. There are multiple ways to implement the conditions "ingress interface/VRF==L1". For example, the segment conduit could be installed in a VRF only associated with L1. Alternatively, the network element 312 may implement an access control list (ACL) that denies the segment conduit on any interface other than L1 (i.e., is rejected on any interface that is not L1).

The provisioning supports a "random" (i.e., pseudo-random) local allocation by the network controller (and or by the network element) based on any one or more of: a pre-configured IPv6 address range assigned to network element for provisioning segment conduit identifiers, a dynamic local label allocation for MPLS; and/or an operator/controller based assignment (e.g., where the range is known by the network controller and it allocates within that range).

At 332, the network controller 308 initiates monitoring and/or accounting of the service associated with the segment conduit. In addition, the network controller 308 may report the monitoring and/or the accounting to the network element 306 (or another device in the customer network 302 or otherwise associated with the customer). For example, as part of the provisioning of the policy, the network controller 308 may request a pair of packet and byte counters to be associated with the segment conduit. In addition, the network controller 308 may request continuous performance monitoring for the policy. In operation, the network controller 308 may periodically transmit a performance monitoring probe to each segment on the SID list. The monitoring may be used to determine any changes in the segment conduit (e.g., changes in topology, performance of any one or more link in the segment conduit such as latency, loss, and/or operational status). The path for the segment conduit can be recomputed (e.g., the SID list is updated) based on any changes in the segment conduit. The network controller 308 may provide event-based (e.g. threshold exceeded) reporting of the performance monitoring of the segment conduit. In some example, the PBR policy on the network element 306 includes actions (e.g., operations) that are executed based on the output of the reporting.

Leveraging the performance reporting requires an automated mechanism for responding to changing conditions along the path/service. For example, in an SDN environment, the customer's network may include a controller (e.g., network controller 105 of FIG. 1), which may either (1) periodically polls (e.g., using a northbound API) a controller in the SP network (e.g., network controller 308 of FIGS. 3A and 3B, which corresponds to 104 of FIG. 1), and/or (2) receives an event-driven notification. As a result, the customer's controller updates (e.g., programs) the PBR policy on the network element 306. The IETF RFC 4760 defines extensions to BGP. RFC 4760 describes subsequent address family identifiers (SAFI), which are used to identify a network layer protocol of a next hop. The Internet Assigned Numbers Authority (IANA) specifies parameters (e.g., SAFI values and corresponding descriptions for each value) for using SAFI. In a distributed environment, a BGP extension (e.g., variation of the tunnel SAFI) can be used to distribute a segment conduit from an ingress PE device to the network element 306. An SLA definition of the segment conduit is included in the BGP extension (e.g. low-latency, each link has a particular loss, disjoint from another segment conduit) in combination with a geo-zone destination of the segment conduit and a most current latest performance monitoring report. For example, an update could be paced every 15 minutes with an exceptional immediate notification when a performance threshold is exceeded.

At 334, the network controller 308 transmits to the network element 306, the conduit segment identifier and the interface identifier corresponding to the service (i.e., the service requested at 314). At 336, the network element 306 stores the conduit segment identifier and the interface identifier in a memory element. The memory element may store similar data for other services. For example, the network element 306 may have created multiple conduit segments/services using the operations described herein (i.e., each customer may have multiple segment conduits). The memory element may store a plurality of segment identifiers and interface identifiers corresponding to a plurality of services (and a corresponding path for each service). The network element 306 can control the routing of packets in the service provider network 304 by selecting at least one of the plurality of services over which to transmit a packet based on the corresponding segment identifier. Thus, the network element 306 control the constraints of a service (i.e., customization based on the request at 314), timing of the creation of the service (e.g., based on the time at which the request is sent at 314), and selection a service on which a packet is transmitted (i.e., service/path differentiation based on choosing which of the services to which a packet is sent).

Exemplary Use of SR Conduits to Control Path Differentiation in Another Network

Using segment conduits, as disclosed herein, a customer premise equipment (CPE) may request a service and define its parameters (e.g., as described with respect to FIGS. 3A and 3B); after a segment conduit is generated for the service, the CPE can route data traffic to the services using the segment conduit (e.g., as described below with respect to FIGS. 4A and 4B). At a high level, the CPE steers the traffic by labeling a packet (of the data traffic) with a segment conduit identifier and sends it to an address associated with the segment.

Figure 4A:
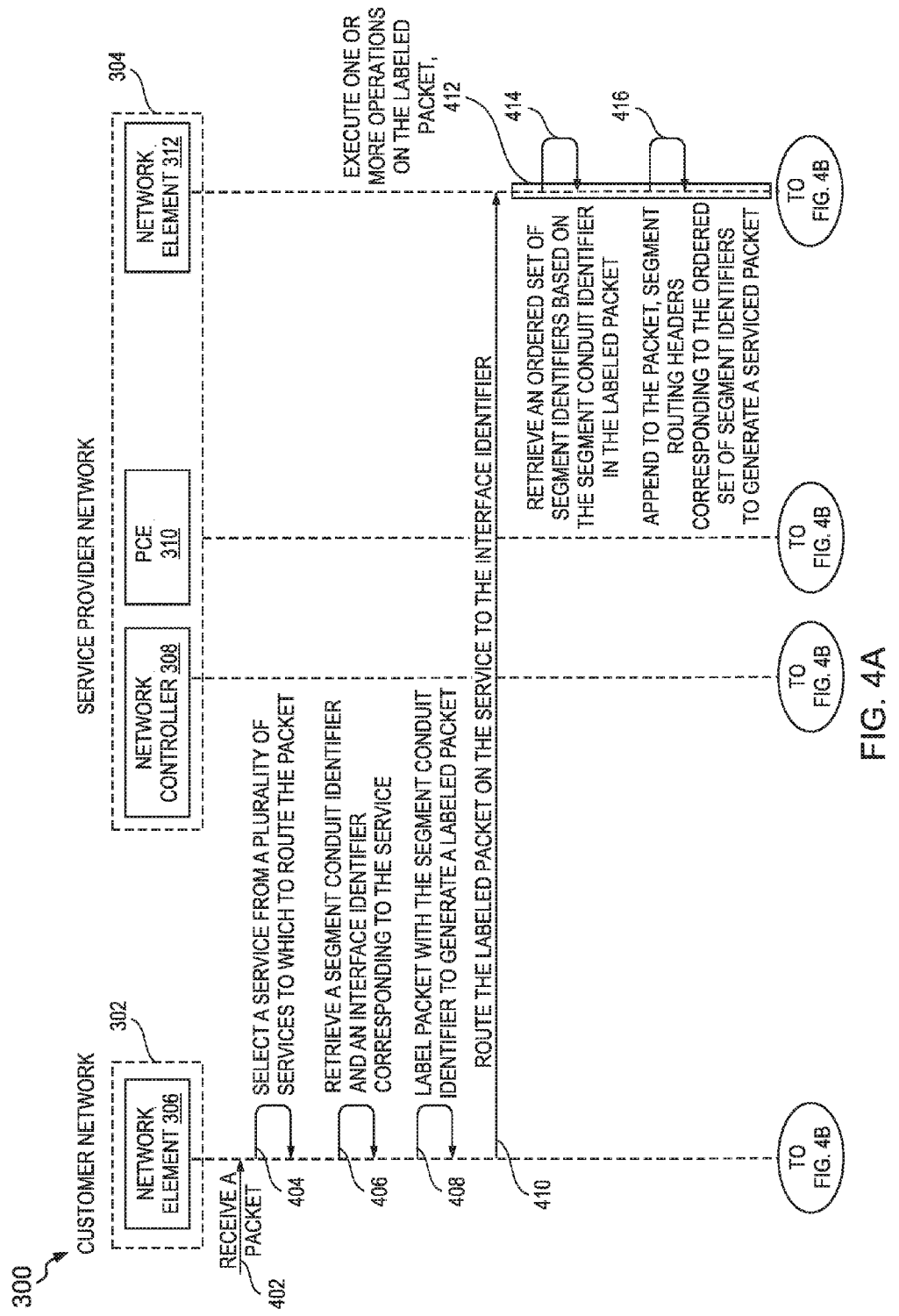
FIGS. 4A and 4B illustrate the exemplary system of FIGS. 3A and 3B and a workflow for utilizing network services, according to some embodiment of the present disclosure.
Figure 4B:
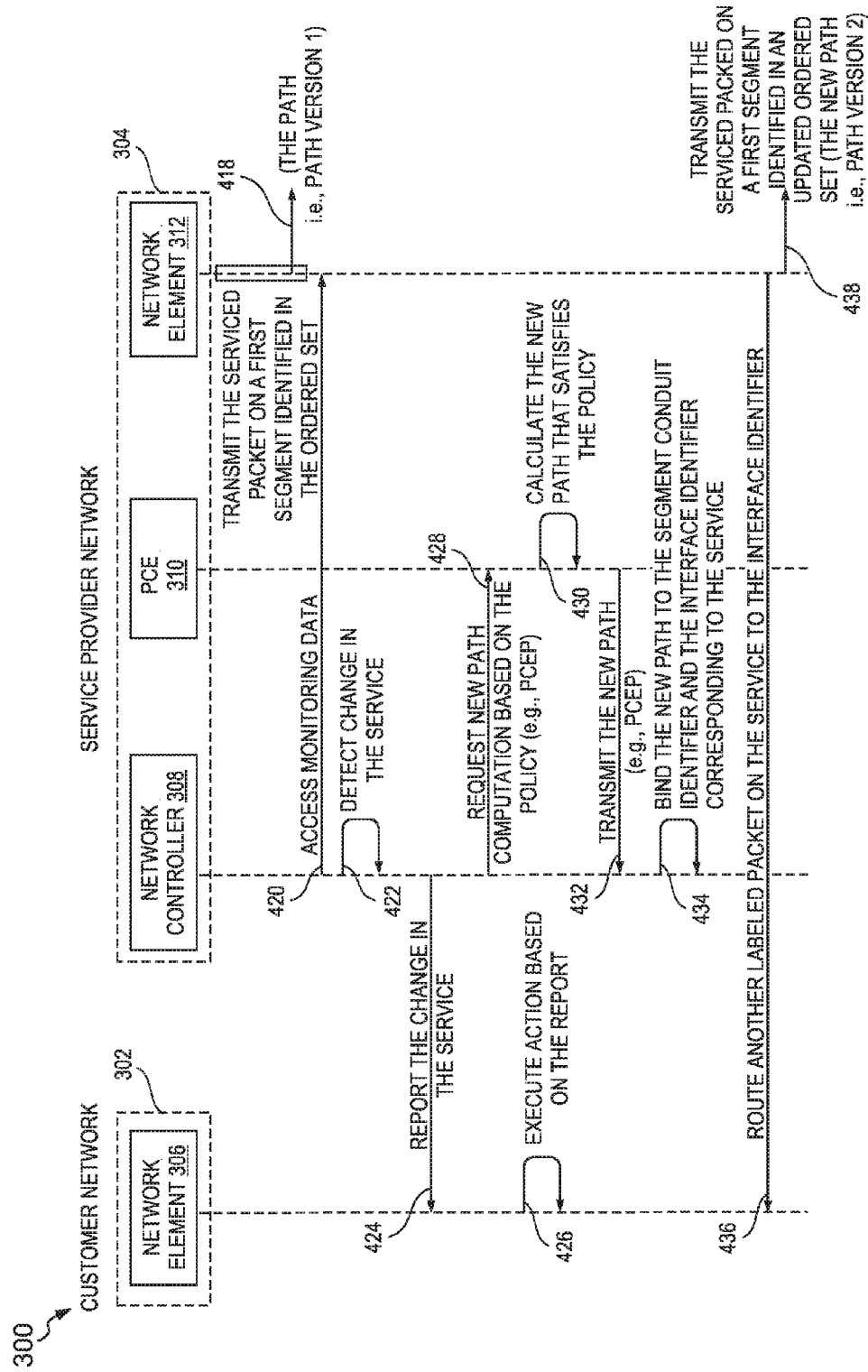

Turning to FIGS. 4A and 4B, FIGS. 4A and 4B illustrate the system 300 (of FIGS. 3A and 3B) and a workflow for utilizing network services, according to some embodiment of the present disclosure. The system 300 of FIGS. 4A and 4B include the same elements as is described for the system 300 of FIGS. 3A and 3B. In this example, the network element 306 controls the routing of packets in the service provider network 304 using segment conduits.

At 402, the network element 306 receives a packet. The network element 306 looks up a VPN destination of the packet and maps it to a remote network element (e.g., a CPE in another sub-network of the customers network). In some examples, this routing information is signaled within the VPN via any routing protocol (e.g. BGP or EIGRP) or resolved within the VPN via LISP. It is noted that the SR conduit behavior applies to any VPN routing scheme and is not dependent on BGP, EIGRP, or LISP. The network element 306 adds an outer header (e.g., outer IPv6 header, network service header (NSH)) to the packet where the source and destination addresses of the outer header are respectively the source address of the packet and the VPN destination.

The network element 306 controls the routing of the packet to at least one of a plurality of services in the service provider network 304. At 404, the network element 306 selects a service from the plurality of services to which to route the packet. At 406, the network element 306 retrieves (e.g., from a memory element) a segment conduit identifier and an interface identifier corresponding to the service. At 408, the network element 306 labels the packet with the segment conduit identifier to generate a labeled packet.

The network element 306 may check whether the packet matches any of a plurality of Policy-Based Routing (PBR) policies. The network element may use the PBR policy to classify the packet as matching criteria corresponding to one of a plurality of services based on the PBR policy. For example, the network element 306 may access a memory element storing a plurality of segment identifiers and an interface identifiers corresponding to a plurality of services. Thus, the service can be selected based on the classification of the packet based on the PBR policy. When it is determined that the packet matches a PRB policy, the network element 306 inserts, into the outer header, a segment routing extension header comprising two segments. A first segment (of the two segments) is a segment conduit corresponding to the matched PBR policy (i.e., labeled the packet with the segment conduit identifier). The second segment is a segment corresponding to the VPN destination. In effect, the patch is first routed through the service corresponding to the segment conduit and is then routed to the destination. The outer destination address is updated to reflect the active segment (the segment conduit). When it is determined that the packet does not match any PRB policy, the network element 306, the destination addresses of the outer header remains the VPN destination and the SR extension header is not inserted into the outer header.

The network element 306 transmits the labeled packet to the service provider network 304 via the interface. In this example, the interface is a network interface port on the network element 312, which is located in the service provider network 304. At 410, the network element 306 routes the labeled packet to the interface identifier (i.e., steers the packet onto the service and to the network element 312). The packet is sent on the shortest path to the interface identifier (e.g., the outer destination address). In some examples, to increase the speed of the operations, the interface identifier can be cached within the any of the preceding procedures (e.g., 404, 406, and/or 408) so that identifying the shortest path to the interface identifier does not require another lookup (e.g., does not require accessing a FIB). The network element 312 receives the labeled packet.

At 412, the network element 312 executes one or more operations on the labeled packet. The network element 312 stores a database of segment conduit identifiers and corresponding operations. The network element 312 is programmed to perform the operations on any packets labeled with the corresponding segment conduit identifier. In this example, the network element 312 is programmed to an operation of appending, to any packet labeled with the conduit segment identifier, segment routing headers that correspond to the ordered set of segment identifiers. The ordered set of segment identifiers defines a path through the network for the conduit segment. The packet is then transmitted out form the network element along the path. Thus, the one or more operations include 414, at which the network element 312 retrieves an ordered set of segment identifiers based on the segment conduit identifier in the labeled packet; 416, at which the network element 312 appends to the labeled packet, segment routing headers corresponding to the ordered set of segment identifiers to generate a serviced packet; and 418, at which the network element 312 transmits the serviced packet on the first segment identified in the ordered set of segment identifiers. In some examples, the ordered set of segment identifiers may be encoded in a network service header (NSH).

At 420, the network controller 308 accesses monitoring data from the network element 312. The network controller 308 and/or the network element 312 may control the monitoring data. For example, the network controller 308 can periodically request (e.g., pull) the monitoring data from the network element 312. Alternatively, the network element 312 can periodically transmit (e.g., push) the monitoring data to the network controller 308. The network controller 308 may periodically transmit a performance-monitoring probe to each segment in the network to gather monitoring data. The monitoring data may be inclusive of operational performance parameters of the network element 312 and/or an accounting of data managed for a particular conduit segment.

In some examples, the monitoring data is used for billing purposes. For example, the service provider may apply a billing model (e.g., flat, tiered, usage-based) to any traffic steered on the segment conduit. In some examples, the billing model supports both SP-managed and customer-managed implementations. The accounting can track, e.g., all packets and bytes on a per-customer basis (and may further separately track billing data for each segment conduit provisioned for the customer).

The monitoring data is used to control the functioning of the conduit segment. In this example, changes are detected based at least in part on the monitoring data and such changes are reported to the consumer. At 422, the network controller 308 detects a change in the service (e.g., based on the monitoring data). The monitoring may be used to determine any changes in any segment conduits that exist in the service provider network 304 (e.g., changes in topology, performance of any one or more link in a segment conduit such as latency, loss, and/or operational status). At 424, the network controller 308 reports the change in the service to the network element 306. The network controller 308 may provide event-based (e.g. threshold exceeded) reporting of the performance monitoring of the segment conduit.

At 426, the network element 306 executes an action based on the report. For example, a PBR policy on the network element 306 may include actions (e.g., operations) that are executed based on the output of the reporting. For example, applications A and B (located on the network element 306 in London) may need low-latency SC conduits to Manhattan and Tokyo respectively. The network element 306 is provisioned with redundant Internet services from two providers SP1 and SP2. Low-latency conduits to Manhattan and Tokyo are ordered from each provider (respectively SP1.Man, SP1.Tok, SP2.Man and SP2.Tok). The network element 306 is configured to load-share its outbound traffic by default between the two providers. The network element 306 is also configured with the following 4 PBR rules:

If (A and RemoteCPEisin(Manhattan) and PerfReportIsGood(SP1.Man)) then PBR SP1.Man, weight 1

If (A and RemoteCPEisin(Manhattan) and PerfReportIsGood(SP2.Man)) then PBR SP2.Man, weight 1

If (B and RemoteCPEisin(Tokyo) and PerfReportIsGood (SP1.Tok)) then PBR SP1.Tok, weight 1

If (B and RemoteCPEisin(Tokyo) and PerfReportIsGood (SP2.Tok)) then PBR SP2.Tok, weight 1

This means that a flow from application A to Manhattan would normally be load-shared between conduits SP1.Man and SP2.Man (instead of being load-share between the bulk internet service of SP1 and SP2). When a performance problem is detected by SP1 for its SP1.Man SR conduit, it reports it to the customer (e.g., NB-API notification and/or BGP triggered update). Immediately, the network element 306 PBR policy is adapted to reflect the information (PerfReportIsGood(SP1.Man) becomes false). As a result, the network element 306 only sends the A flow onto the conduit SP2.Man via provider 2.

The change detected in the service at 422 prompts the network controller 308 to request a new path for the service. At 428, the network controller 308 requests, from the PCE 310, a new path computation based on the policy. For example, the change may indicate that the performance of one or more segment in the path no longer satisfies the constraints defined in the policy (i.e., the same policy as was generated in 318 of FIG. 3A). Thus, the policy is used to request a new path that satisfies the policy. At 430, the PCE 310 calculates the new path that satisfies the policy. At 432, the PCE 310 transmits the new path to the network controller 308. At 434, the network element 308 binds the new path to the segment conduit identifier and the interface identifier corresponding to the service. The operations associated with 428, 430, and 432, and 434 are similar to operations associated with 320, 322, 324, and 326 of FIG. 3A. In addition, the operations associated with 428, 430, and 432, and 434 are performed without any action from the customer or service provider. Instead, the network controller 308 proactively and automatically binds the new path to the service based on detecting the change in the previous path.

In effect, the new path is a new version of the path (i.e., version two of the path). There is no need for the controller 308 to resend (to the network element 306) the segment conduit identifier and the interface identifier corresponding to the service since they have not changed. Instead, only the path that underlies the service has changed. Thus, the network element 306 can continue to transmit packets to the conduit segment using the same segment conduit identifier and the same interface identifier; however, the new path (i.e., version two of the path) will be used for future packets transmitted onto the conduit segment. At 436, the network element 306 routes another labeled packet to the interface identifier (i.e., steers another packet onto the service and to the network element 312). Because the path underlying the service was updated (i.e., updated to the new path at 434), the packet is transmitted onto the new path. Thus, at 438, another serviced packet is transmitted on a first segment identified in an updated ordered set of segment identifiers (i.e., corresponding to the new path).

In the above examples, the customer (e.g., via a network element in the customer network) manages the paths over which their traffic is transported. However, in other examples, the service provider may manage the paths for the customer. For example, the customer may use a portal (e.g., a NB-API into a controller in the SP network) to request a segment conduit and define its constraints. In such an example, the service provider performs processes similar to those described for the customer. The customer only needs to define its policies (e.g., specifying constraints). The provider translates these constraints into segment routing conduits in its infrastructure and PBR policies to use them.

Figure 5:
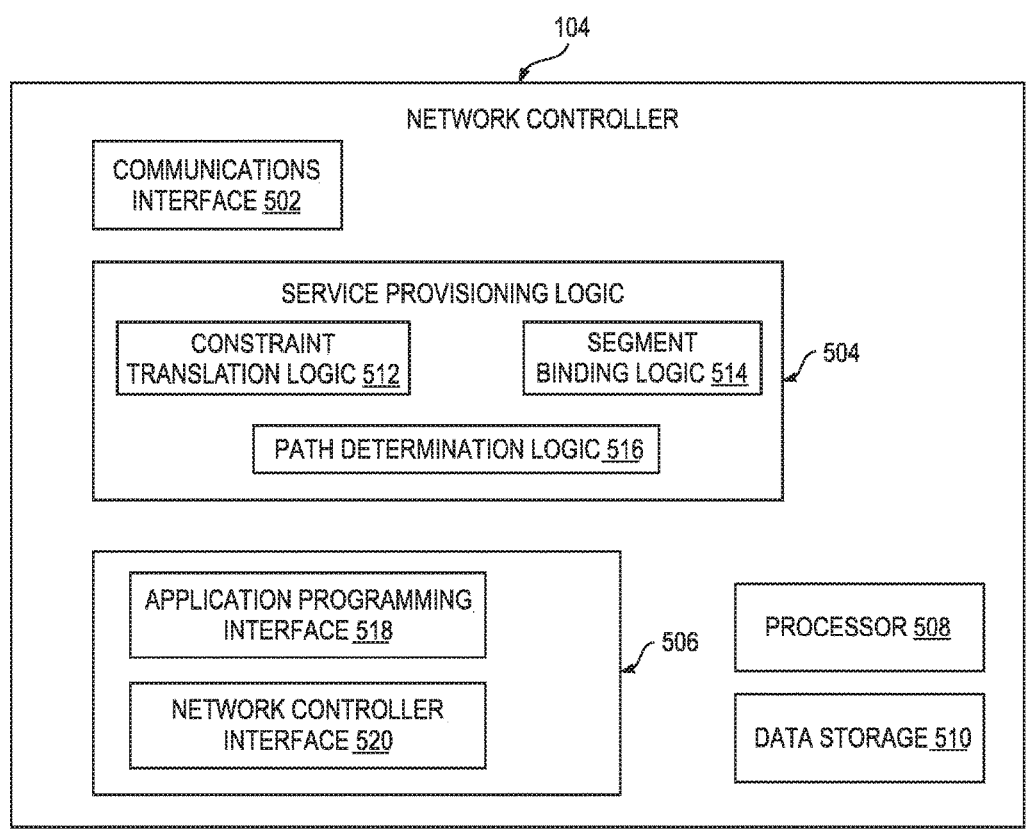
FIG. 5 is a network controller according to some embodiments of the present disclosure.

FIG. 5 is a network controller (i.e., network controller 104) according to some embodiments of the present disclosure. The network controller 104 includes a computer system to facilitate performance of its operations. In particular embodiments, the computer system comprises a processor 508, a memory 506, data storage 510, one or more communication interfaces 502, and service provisioning logic 504. These components may work together in order to provide functionality described herein. The network controller 104 of FIG. 5 is an example of the network controller 104 of FIG. 1. In a particular implementation, the network controller 14 is a Software Defined Networking (SDN) controller.

The one or more communication interfaces 502 may be used for the communication of data between endpoints (114a-e), network elements (116a-o, 118a-b, 120a-b), and/or one or more networks (e.g., 108, 110a-c, and/or 112). For example, communication interface 502 may be used to send and receive data packets for a communication session.

The service provisioning logic 504 comprises constraint translation logic 512, segment binding logic 514, and path determination logic 516. The constraint translation logic 512 may be utilized to translate constraints (e.g., received from a network element) into a format according to a data encoding protocol for path computation (e.g., PCEP) (e.g., as described with respect to 204 and/or 206 of logic 200). The segment binding logic 514 may be used to bind a segment to a computed path (e.g., as described with respect to 210 of logic 200). The path determination logic 516 may be utilized to process data received from a CPE to identify a path for a customer (e.g., as described with respect to 208 of logic 200).

The memory 506 includes interfaces 518 and 520. Application interface 518 may be an application programming interface (API) for communicating with applications deployed in network (e.g., receiving requests from the network elements (and/or applications thereon), replying to the network elements, transmit instructions the network elements, and the like). The network controller interface 520 may be an API (e.g., a NB-API of an SDN controller) utilized to communicate with a network controller.

Processor 508 may be a microprocessor, controller, or any other suitable computing device, resource, or combination of hardware, stored software and/or encoded logic operable to provide, either alone or in conjunction with other components of network controller 104. In some embodiments, network controller 104 may utilize multiple processors to perform the functions (e.g., logic) described herein.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Memory 506 and/or data storage 510 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 506 and/or data storage 510 may store any suitable data or information utilized by network controller 104, including software embedded in a computer readable medium, and/or encoded logic incorporated in hardware or otherwise stored (e.g., firmware). Memory 506 and/or data storage 510 may also store the results and/or intermediate results of the various calculations and determinations performed by processor 508.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

In one implementation, the network controller described herein may include software to achieve (or to foster) the functions discussed herein for enabling path differentiation where the software is executed on one or more processors to carry out the functions. This could include the implementation of instances of network controllers, headends, network elements, PCEs, SDN controllers, and/or any other suitable element that would foster the activities discussed herein. Additionally, each of these elements can have an internal structure (e.g., a processor, a memory element, etc.) to facilitate some of the operations described herein. In other embodiments, these functions for path differentiation may be executed externally to these elements, or included in some other network element to achieve the intended functionality. Alternatively, network controllers may include software (or reciprocating software) that can coordinate with other network elements in order to achieve the path differentiation functions described herein. In still other embodiments, one or several devices may include any suitable algorithms, hardware, software, components, modules, interfaces, or objects that facilitate the operations thereof.

In certain example implementations, the path differentiation functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable path differentiation functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the path differentiation, as outlined herein. Additionally, each of these devices may include a processor that can execute software or an algorithm to perform the path differentiation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of path differentiation, as potentially applied to a myriad of other architectures.

It is also important to note that the steps in the FIG. 2 illustrate only some of the possible scenarios that may be executed by, or within, the network controllers described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the network controllers in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving, at a network controller in a service provider network, a request associated with initiating a service, wherein the request comprises at least one path constraint and is received from a first network element in a consumer network;
    converting the at least one path constraint to service provisioning data according to a data encoding protocol;
    identifying a path based on the service provisioning data;
    binding a conduit segment identifier and an interface to the path, wherein the interface has an interface identifier and is associated with one or more operations to perform on any traffic that is labeled with the conduit segment identifier, wherein the interface is connected to a second network element that is located in the service provider network; and
    in response to the request, forwarding, by the network controller in the service provider network, the conduit segment identifier and the interface identifier to the first network element in the consumer network to enable the first network element in the consumer network, when the first network element receives a packet, to transmit the packet through the path via the interface in the service provider network by modifying the packet based on the conduit segment identifier and the interface identifier.

2. The method of claim 1, wherein the interface identifier is an Internet Protocol version 6 address or a Multiprotocol Label Switching segment identifying a headend in the service provider network.

3. The method of claim 1, further comprising:
    routing the packet to the service by:
        inserting the conduit segment identifier into the packet to generated a labeled packet; and
        transmitting the labeled packet to the service provider network via the interface.

4. The method of claim 1, wherein the binding the conduit segment identifier to the path comprises:
    storing, on the interface, an ordered set of segment identifiers that define the path; and
    programming the interface to perform the one or more operations, the one or more operations comprising appending, to any packet labeled with the conduit segment identifier, segment routing headers that correspond to the ordered set of segment identifiers, wherein the interface is a network element that is located in the service provider network.

5. The method of claim 1, wherein the one or more operations comprise: appending, to any packet labeled with the conduit segment identifier, a network service header.

6. The method of claim 1, wherein the identifying the path through the network based on the service provisioning data comprises:
transmitting, by the network controller, the service provisioning data to a path computation element; and
receiving the path from the path computation element, wherein the path computation element calculates the path through the network based on the service provisioning data.

7. The method of claim 1, wherein the identifying the path through the network based on the service provisioning data comprises the second network element or the network controller calculating the path through the network based on the service provisioning data.

8. The method of claim 1, wherein the path corresponds to a service chain in which each in an ordered set of segment identifiers identifies a service in the service chain.

9. The method of claim 1, wherein the path corresponds to a mix of service and path forwarding instructions.

10. The method of claim 1, further comprising:
receiving, by the network controller, a plurality of paths corresponding to a plurality of services; and
binding a corresponding conduit segment identifier and a corresponding interface to each of the plurality of paths;
wherein the network controller controls the routing of packets in the service provider network by selecting at least one of the plurality of services to transmit each of the packets based on the corresponding conduit segment identifier.

11. The method of claim 6, wherein the path computation element is located in the service provider network.

12. The method of claim 1, wherein the request further comprises a destination identifier and a source identifier.

13. The method of claim 1, wherein the at least one path constraint comprises: a plurality of constraints each of which is defined by a service level agreement between the service provider network and the customer network.

14. The method of claim 1, wherein the converting the at least one path constraint to service provisioning data according to a data encoding protocol comprises:
encoding the at least one path constraint in the request according to a path computation element communication protocol.

15. The method of claim 1, the at least one path constraint comprise one selected from the group consisting of: a segment routing traffic engineering policy (SRTE policy), a bandwidth, a list of network elements that the path must traverse, a list of segment routes that the path must traverse, a latency, a policy, an affinity, an administrative group, a path characteristic, a metric type, a hop limit, a priority, a symbolic name, a record route, a label stack, a traffic engineering metric, an Border Gateway Protocol community value, a category of tagged routes within a Border Gateway Protocol community, an Interior Gateway Protocol (IGP) metric, administrative group, a bound on a path cost that must not be exceeded for the path to be considered as acceptable, a bound on a path cost that must be exceeded for the path to be considered as acceptable, and a hop count.

16. An apparatus located in a service provider network, the apparatus comprising:
at least one processor;
a communications interface configured to receive a request associated with initiating a service, wherein the request comprises at least one path constraint and is received from a first network element in a consumer network; and
a service provisioning logic element that, when executed by the at least one processor, configures the apparatus to:
convert the at least one path constraint to service provisioning data according to a data encoding protocol;
identify a path based on the service provisioning data;
bind a conduit segment identifier and an interface to the path, wherein the interface has an interface identifier and is associated with one or more operations to perform on any traffic that is labeled with the conduit segment identifier, wherein the interface is connected to a second network element that is located in the service provider network; and
in response to the request, forward, by the network controller in the service provider network, the conduit segment identifier and the interface identifier to the first network element in the consumer network to enable the first network element in the consumer network, when the first network element receives a packet, to transmit the packet through the path via the interface in the service provider network by modifying the packet based on the conduit segment identifier and the interface identifier.

17. The apparatus of claim 16, wherein the service provisioning logic element binds the conduit segment identifier to the path by:
storing, on the interface, an ordered set of segment identifiers that define the path; and
programming the interface to perform the one or more operations, the one or more operations comprising appending, to any packet labeled with the conduit segment identifier, segment routing headers that correspond to the ordered set of segment identifiers, wherein the interface is a network element that is located in the service provider network.

18. The apparatus of claim 16, wherein the service provisioning logic element identifies the path through the network based on the service provisioning data by:
transmitting the service provisioning data to a path computation element; and
receiving the path from the path computation element, wherein the path computation element calculates the path through the network based on the service provisioning data.

19. At least one computer-readable non-transitory medium comprising one or more instructions, that when executed by one or more processors configure the one or more processors to perform one or more operations comprising:
receiving, at a network controller in a service provider network, a request associated with initiating a service, wherein the request comprises at least one path constraint and is received from a first network element in a consumer network;
converting the at least one path constraint to service provisioning data according to a data encoding protocol;
identifying a path based on the service provisioning data;
binding a conduit segment identifier and an interface to the path, wherein the interface has an interface identifier and is associated with one or more operations to perform on any traffic that is labeled with the conduit segment identifier, wherein the interface is connected to a second network element that is located in the service provider network; and in response to the request, forwarding, by the network controller in the service provider network, the conduit segment identifier and the interface identifier to the first network element in the consumer network to enable the first network element in the consumer network, when the first network element receives a packet, to transmit the packet through the path via the interface in the service provider network by modifying the packet based on the conduit segment identifier and the interface identifier.

20. The at least one computer-readable non-transitory medium of claim 19, wherein the interface identifier is an Internet Protocol version 6 address or a Multiprotocol Label Switching segment identifying a headend in the service provider network.

* * * * *